(12) United States Patent
Davis

(10) Patent No.: US 7,818,783 B2
(45) Date of Patent: Oct. 19, 2010

(54) SYSTEM AND METHOD FOR GLOBAL ACCESS CONTROL

(76) Inventor: Russell J. Davis, 9747 Water Oak Dr., Fairfax, VA (US) 22031-1029

(*) Notice: Subject to any disclaimer, the term of this patent is extended or adjusted under 35 U.S.C. 154(b) by 1230 days.

(21) Appl. No.: 11/369,761

(22) Filed: Mar. 8, 2006

(65) Prior Publication Data
US 2007/0214493 A1  Sep. 13, 2007

(51) Int. Cl.
G06F 7/04 (2006.01)
G06F 21/00 (2006.01)
G11C 7/00 (2006.01)
H04L 29/06 (2006.01)
H04L 9/32 (2006.01)

(52) U.S. Cl. ............... 726/2; 726/3; 726/9; 726/16; 726/20; 713/150; 713/152; 713/159; 713/161; 713/166; 713/168; 713/182; 713/185; 340/5.2; 340/5.21; 340/5.6; 340/5.8; 340/5.81

(58) Field of Classification Search ............... 726/9, 726/2, 3, 16, 20; 713/150, 152, 159, 161, 713/166, 168, 182, 185; 340/5.2, 5.21, 5.6, 340/5.8, 5.81
See application file for complete search history.

(56) References Cited

U.S. PATENT DOCUMENTS

| 5,979,754 | A | 11/1999 | Martin et al. | |
|---|---|---|---|---|
| 6,915,953 | B2 | 7/2005 | Imazuka | |
| 2002/0099945 | A1 | 7/2002 | McLintock et al. | |
| 2003/0005326 | A1 | 1/2003 | Flemming | |
| 2003/0028814 | A1 | 2/2003 | Carta et al. | |
| 2003/0144956 | A1* | 7/2003 | Yu et al. ............... | 705/42 |
| 2003/0154393 | A1 | 8/2003 | Young | |
| 2003/0158819 | A1 | 8/2003 | Scott | |
| 2004/0049675 | A1 | 3/2004 | Micali et al. | |
| 2004/0153671 | A1 | 8/2004 | Schuyler et al. | |
| 2004/0261478 | A1 | 12/2004 | Conforti | |

(Continued)

FOREIGN PATENT DOCUMENTS

WO    WO 2004070664    8/2004

(Continued)

OTHER PUBLICATIONS http://www.amtel-security.com/products/proximity_card_readers.html proximity card readers retrieved on Jan. 10, 2006.

(Continued)

*Primary Examiner*—Aravind K Moorthy
(74) *Attorney, Agent, or Firm*—Richard C. Litman

(57) ABSTRACT

The global access control system and method presents a solution to synchronizing the physical access devices that federal agencies must try to meet Federal Information Processing Standards (FIPS) 201 requirements. The method encompasses wire and wireless technology, IP Security (IPSec), the assignment of IPv6 addresses to every device, integrating with logical access control systems, and providing a homogeneous audit and control format. As part of FIPS 201, Government identification badges (Personal Identity Verification (PIV) cards) will include an IPv6 address that uniquely identifies every card holder. By assigning an IPv6 address to every access device and using the card holder's IPv6 address, every access device can be used for global access control. Moreover, common and interoperable audit records throughout an entire enterprise (logical and physical) are possible. This unique combination of technologies provides a mechanism for integrating heterogeneous systems to provide merging of physical and logical access control systems.

9 Claims, 7 Drawing Sheets

U.S. PATENT DOCUMENTS

| | | |
|---|---|---|
| 2005/0033962 A1 | 2/2005 | Libin et al. |
| 2005/0055567 A1 | 3/2005 | Libin et al. |
| 2005/0138380 A1 | 6/2005 | Fedronic et al. |
| 2005/0163078 A1* | 7/2005 | Oba et al. .................. 370/331 |
| 2005/0207320 A1 | 9/2005 | Park |
| 2007/0124592 A1* | 5/2007 | Oyama ....................... 713/171 |

OTHER PUBLICATIONS www.wyrelessaccess.com/WRI-OTD.htm SCHLAGE Wyreless Access Products.

* cited by examiner

SYSTEM AND METHOD FOR GLOBAL ACCESS CONTROL

BACKGROUND OF THE INVENTION

1. Field of the Invention

The present invention relates to secure access technology, and more specifically to a system and method for global access control that provides for physical and logical access control to information technology (IT) systems.

2. Description of the Related Art

Concern over terrorist attacks has necessitated improvements in physical and logical access approaches. However, shortcomings remain that are addressed by this invention. If a person is forced under duress to reveal their Personal ID Number (PIN) and surrender their PIV card, present technology does not allow for investigators to easily determine through a simple searching method which systems and facilities the bad actor accessed.

Current physical access control systems (PACS) are typically interoperable only with the vendor's product. Likewise, logical access systems, where users access networks and applications, are typically separated from any physical access control system.

With the requirements emerging from Homeland Security Presidential Directive 12 (HSPD-12) and expanded by FIPS 201, Personal Identity Verification (PIV) cards are required for federal facilities access and for logical access to computing environments. Unfortunately, most of the current PACS facilities devices are based on wire or fiber technology and lack any integration with logical access systems.

Concurrent with the deployment of the PIV cards are advancements in, and availability of, secure wireless technologies. Most of the facilities access points will be based on contact-less technology. Typical approaches include large panels that control a limited number of entry point devices. For facilities designated as historic, stringing cable along walls might be detrimental and are candidates for wireless connections.

Thus, a system having a wireless option that uses existing technology to quickly meet the HSPS-12 and FIPS 201 requirements would be highly desirable. Under such a novel system, significant costs associated with installing control panels and cable would be eliminated for most installations.

One major obstacle preventing integration of various vendor approaches is the lack of a standard device representation. For example, the basic Internet Protocol (IP) uses 32-bit addresses, thereby resulting in a limitation of 4,294,967,296 addresses. In contrast, IPv6 uses a 128-bit address, resulting in approximately $34E^{36}$ (34 followed by 36 zeros) addresses. Because the office of Management and Budget (OMB) issued M-05-22 that requires federal agencies to migrate to IPv6, it is envisioned that every computer in the Federal space will be assigned an IPv6 address. Yet, to date, access control devices having limited addressing remain the standard.

Moreover, by having a unique address for every physical access control device and every computing asset, access controls can be harmonized across different vendor spaces, including between logical and physical access control systems.

International Patent No. WO 2004070664, published Aug. 19, 2004, discloses a method of making a key-shaped security module, but unlike the present invention, apparently does not disclose an IPv6 addressing scheme for the module or the module's reader.

Thus, an access control system utilizing an addressing scheme, such as IPv6, capable of uniquely addressing every physical access device, machine and the like is still sought after.

None of the above inventions and patents, taken either singly or in combination, is seen to describe the instant invention as claimed. Thus, a system and method for global access control solving the aforementioned problems is desired.

SUMMARY OF THE INVENTION

The system and method for global access control presents a solution having the capability of synchronizing physical access devices, which must meet the National Institute of Standards and Technology (NIST) Federal Information Processing Standards (FIPS) 201 requirements defined in the NIST publication entitled "Personal Identity Verification of Federal Employees and Contractors". The system may comprise hardwire and/or wireless technology, IP Security (IP-Sec), IPv6 address assignment to every device, integration with logical access control systems, and provision of a homogeneous audit and control format.

As part of FIPS 201, Government identification badges (Personal Identity Verification (PIV) cards) will include an IPv6 address that uniquely identifies every card holder. In addition to the PIV card, which is a class of access device, the system and method of the present invention assigns an IPv6 address to every access device, including security token reading devices, in conjunction with using the card holder's IPv6 address so that every access device can be identified without device conflict and used for global access control.

Moreover, the system and method of the present invention provides the capability to produce common and interoperable audit records of all, or a subset of, both logical and physical access devices, including their properties, throughout the entire government. According to the present invention, this unique combination of technologies includes a mechanism for integrating heterogeneous systems to provide merging of physical and logical access control systems.

For example, the system and method of the present invention includes combining a user's unique IPv6 as furnished by the user's PIV (required by FIPS 201) and an IPv6 of each device used to provide efficient searching and auditing of devices accessed by a holder of the PIV with knowledge of the appropriate PIN.

Thus, a simple status audit of access control devices may reveal to investigators which systems and facilities a particular individual has attempted to access. If the PIV has been compromised, e.g., the aforementioned scenario in which a person is forced under duress to reveal their PIN and surrender their PIV card, the system and method of the present invention provides investigators with the capability to modify the card status in a database to reflect the conditions "card stolen", "PIN compromised". The card status is then made available in the database to all of the IPv6 access devices, logical and physical, so that when access is attempted with the bad card, a number of access control devices may respond by appropriately modifying their status to, e.g., "access denied", "alert activated", and the like. Moreover, due to the global IPv6 identification and record keeping according to the present invention, this kind of searching and response is capable of being provided across both logical and physical systems throughout the entire Federal government space.

Additionally, the system and method of the present invention has the capability to supplant existing panel technology of typical Physical Access Control Systems (PACS). A typical PACS panel requires a large footprint, and supports, i.e., controls, a limited number of interface devices for access control. The panel, in turn, communicates with a PACS computing system that determines access.

However, according to the system and method of the present invention, access control devices, each being uniquely identified by an IPV6 address, may communicate directly with the PACS computing system, thus obviating the necessity of a PACS panel intermediary.

Preferably, the access control devices may have a wireless interface to the PACS computing system. Providing a wireless access point (WAP) for each of the access control devices eliminates the necessity of wiring from the control device to the PACS computing system. It is further contemplated by the system and method of the present invention that standards-based products, such as IEEE 802.11, may be utilized to provide the WAP/wireless infrastructure. Advantageously, use of such a standards-based wireless product incorporates strong encryption, such as the National Institute of Standards and Technology (NIST) Advanced Encryption Standard (AES).

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a global access control system and method that presents a solution having the capability of synchronizing physical access devices, which must meet Federal Information Processing Standards (FIPS) 201 requirements. The invention may comprise hardwire and/or wireless technology, IP Security (IPSec), IPv6 address assignment to every device, integration with logical access control systems, and provision of a homogeneous audit and control format.

Figure 1:
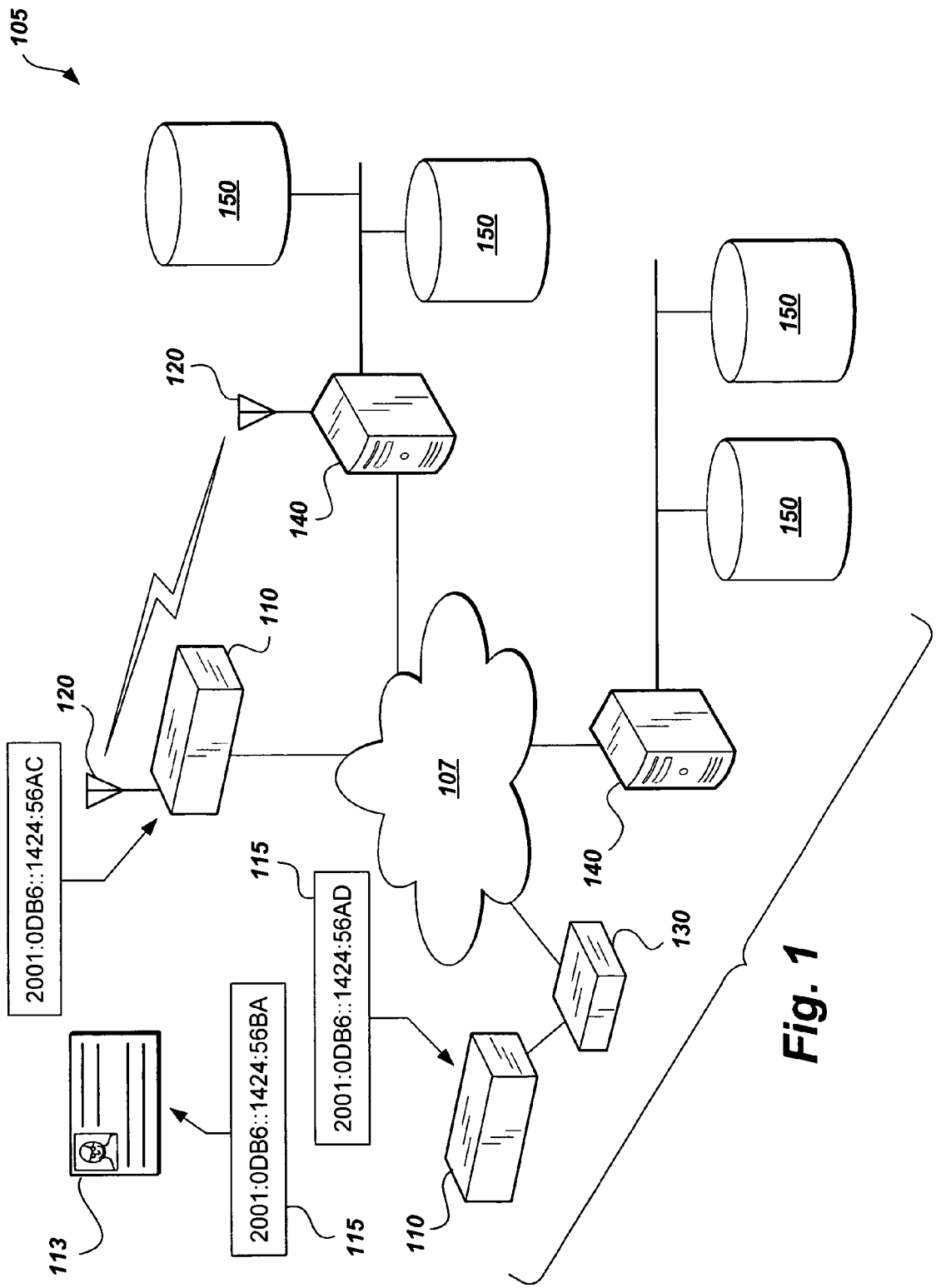
FIG. 1 is a block diagram of a global access control system according to the present invention.

As shown in FIG. 1, the access control system 105 has a plurality of access control devices 110, including security token reading devices, which may have either a wireless interface 120 or a wired interface 130 to a Physical Access Control Systems (PACS) computing system, i.e., plurality of servers 140. The access control devices 110 are preferably networked over a TCP/IP Internet/Intranet cloud 107. Advantageously, each access control device 110 is identified by having a uniquely assigned IPv6 address 115. The IPv6 protocol, as specified by the Internet Engineering Task Force (IETF), is a network layer protocol having a 128-bit address space that can easily accommodate the unique access control device address assignments provided by the present invention. A node address field of a single access control device 110 may comprise up to the complete 128 bits of address space. Alternatively, the 128 bit address space of the IPv6 address 115 may be subdivided into a subnet field, then the node address field, i.e., interface/device ID field, or subdivided into a global routing field, subnet ID field, then the node address field, i.e., interface/device ID field. Notation of the 128 bit address may be represented by 8 groups of four hexadecimal digits, i.e., a 16 octet address length. It is to be understood that any diagrammatic representation of an IPv6 address 115 used within this specification comprises 128 bits of address space, which may be, or alternatively, may not be subdivided into routing and/or subnet prefixes.

When used in conjunction with Government identification badges, i.e., Personal Identity Verification (PIV) cards, being a class of access control device having a security token, including an IPv6 address that uniquely identifies every card holder, such as PIV card 113 having unique IPv6 address 115, additional classes of access control devices 110, such as a security token reader, e.g., card reader, door lock, and the like, can be identified without device conflict, and used for global access control.

Figure 4:
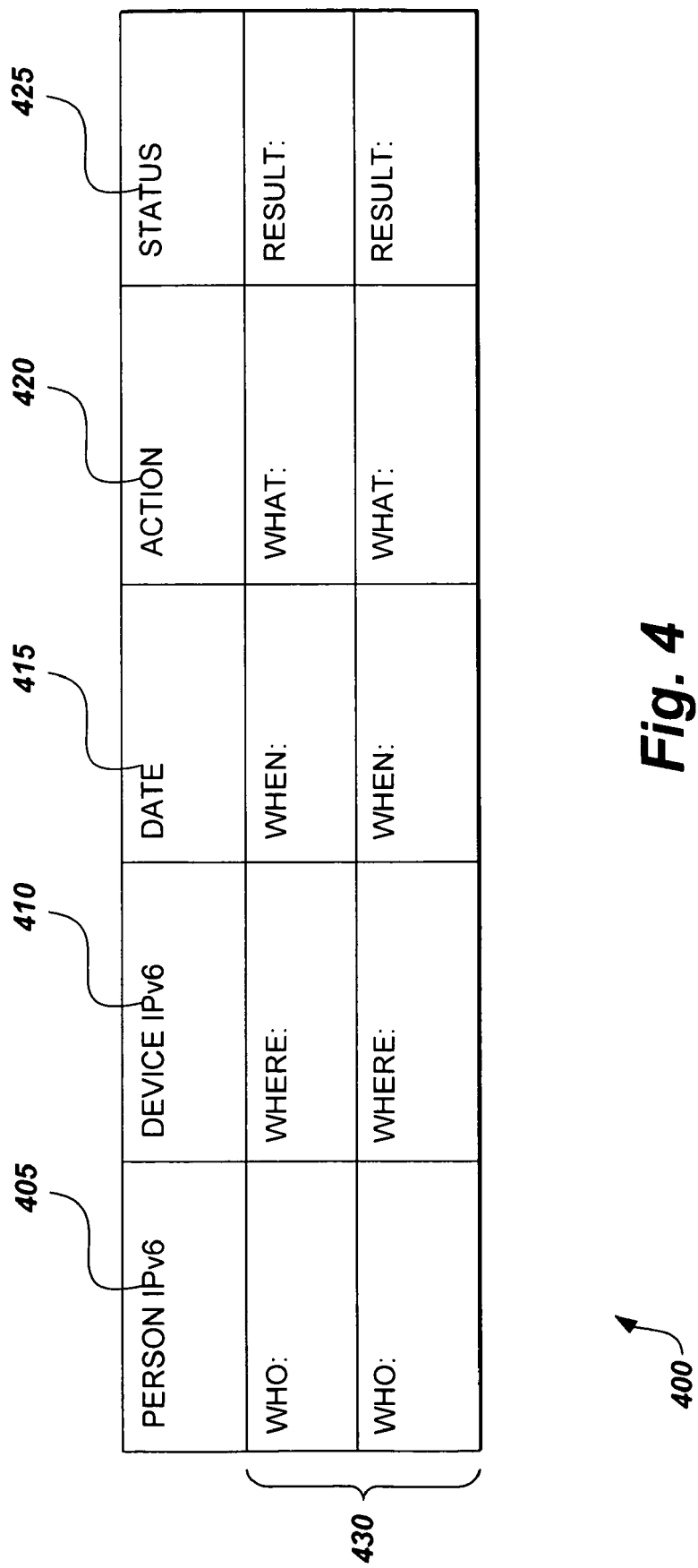
FIG. 4 is a table showing an audit database structure in a global access control system according to the present invention.

Moreover, as shown in FIGS. 1 and 4, the present invention provides the capability to produce common and interoperable audit records, such as records 400, of all or a subset of both logical and physical access devices 110, including their properties, attributes, statuses, and the like, to be maintained in databases 150 residing in mass storage units in operable communication with the plurality of servers 140 throughout the entire enterprise, e.g., government. According to the present invention, this unique combination of technologies includes a mechanism for integrating heterogeneous systems to provide merging of physical and logical access control systems such as, for example, door access control (physical) and email access control (logical).

The present invention includes combining a user's unique IPv6 115 as furnished by the user's PIV 113 (required by FIPS 201) and an IPv6 of each device used, such as devices 110, to provide efficient searching and auditing of devices accessed by a holder of the PIV 113 with knowledge of the appropriate PIN.

Thus a simple status audit of access control devices 110 can be compiled in a table such as table 400, and may reveal to investigators which systems and facilities a particular individual has attempted to access. If the PIV 113 has been compromised, e.g., the scenario in which a person is forced under duress to reveal their PIN and surrender their PIV card, the present invention provides investigators with the capability to change the card status in databases 150 to reflect the conditions "card stolen", "PIN compromised". By means of utilizing the IPv6 address of the stolen card as an index to a descriptive row in table 400 that contains the card's status, i.e., the conditions "card stolen", and "PIN compromised", the card status is then made available in the database 150 to each of the IPv6 access devices, logical and physical, when access is attempted with the bad card, wherein those access control devices may respond by appropriately modifying their statuses, e.g., "access denied", "alert activated", and the like. As shown in FIG. 4, device and card status may be recorded in a status column 425 of audit table 400. Moreover, due to the global IPv6 identification 115 and record keeping according to the present invention, this kind of searching and response is capable of being provided across both logical and physical systems throughout the entire Federal government space.

Additionally, the present invention has the capability to supplant existing panel technology of typical Physical Access Control Systems (PACS). A typical PACS panel (not shown) requires a large footprint and supports, i.e., controls, a limited number of interface devices for access control. The panel in turn communicates with a PACS computing system that determines access.

However, according to the present invention, access control devices 110 each being uniquely identified by an IPV6 address 115 may communicate directly with the PACS computing system 140, thus obviating the necessity of a PACS panel intermediary.

The wireless interface 120 of access control devices 110 to the PACS computing system 140 is preferable. Providing a wireless access point (WAP) for each of the access control devices 110 eliminates the necessity of wiring from each of the control devices 110 to the PACS computing system 140. It is further contemplated by the present invention that standards based products such as IEEE 802.11 may be utilized to provide the WAP/wireless infrastructure. Advantageously use of such a standards based wireless product incorporates strong encryption such as the National Institute of Standards and Technology (NIST) Advanced Encryption Standard (AES).

According to the present invention each access device 110 is provided as a stand-alone device connected by a wire or Wireless Access Point (WAP). These devices 110 are in operable communication with back end server(s), such as PACS server 140 so that the PACS server(s) 140 may calculate control functions based on access control applications. Within the access control points, cryptographic authentication may be provided to bind with the server 140. The present invention can provide a variety of authentication techniques including those based on digital signatures, biometrics, and digital certificates such as described in the FIPS 201.

Digital signature validations of the present invention are preferably in operable communication with devices that correctly implement the NIST FIPS 201. A variety of known certificate validation methods and physical access controls may be used in conjunction with the present invention.

Figure 2:
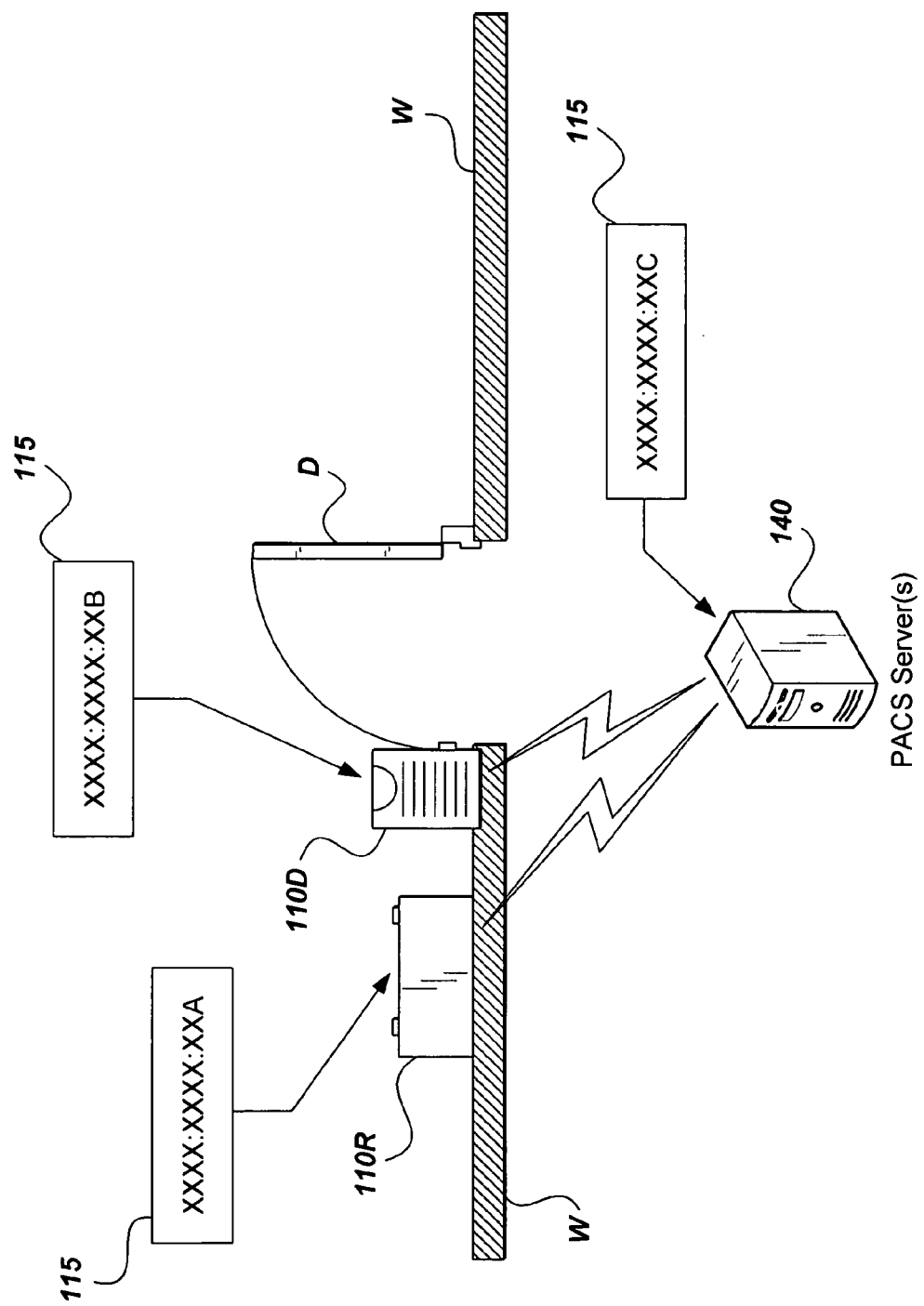
FIG. 2 is a diagrammatic view of an access card reader and door lock in a global access control system according to the present invention.

As shown in FIG. 1, a PACS server 140 is shown in wireless communication 120 with a switch or other interface device 110. If the device 110 is a switch, it could perform interface functions with a plurality of other devices. Alternatively, as shown in FIG. 2, the wireless connection 120 could be to a single device, such as a door lock 110D.

The wireless connection 120 has the benefit of operating in areas where stringing cable may not be feasible. For example, consider a site where there is a chain link fence located around some perimeter such as a motor pool. The present invention contemplates using battery and/or solar power to operate the WAP and solenoid to open the gate. Thus, the entry point could be set up rather quickly by replacing the existing lock with a WAP controlled lock.

It is within the scope of the present invention to provide WAP capability to connect to any IPv6 enabled interface device. Thus wireless connections 120, as shown in FIGS. 1 and 2, may be provided for both contact-less PIV card interfaces and contact PIV card interfaces. For higher risk facilities such as those protecting critical infrastructure environments, a contact interface is required.

Additionally, the IPv6 enabled interface devices 115 of the present invention preferably are compliant with FIPS 201 Personal Computer/Smart Card (PC/SC) interface requirements. Many of these devices in turn rely on a Universal Serial Bus (USB) interface. The present invention may include existing wireless technologies such as IEEE 802.11x, and the like, to provide the wireless network connectivity 120.

The logical method to uniquely identify each device is to use the IPv6 address assignment. The 128-bit IPv6 addressing provided by the present invention is operable with secure protocols, such as IP Security (IPSec), in order to provide additional security protection such as message authentication, message integrity, and message confidentiality to a specific device. Utilization of the IPSec set of cryptographic protocols available within IPv6 is preferable in the event that a wireless connection 120 is established which extends several kilometers or more.

Advantageously, an IPSec connection provided by the present invention is capable of functioning in conjunction with digital certificates to further enhance overall security of the system. The present invention provides assignment and tracking of the device IPv6 addresses 115. Applications running on PACS servers 140 are capable of positively identifying each device 110 and providing back end processing to utilize audit records for analyzing relationships among a user and a plurality of access control devices, including the user's IPv6 enabled access card, such as PIV card 113.

Based on the analyzing of the relationships, an application running on the PACS servers 140 is capable of making a determination of whether access to a facility should be granted or denied. Based on the determination, PACS servers 140 can formulate and transmit access granted or access denied control signals regarding the facility under control. These control signals may be sent over a secured wired or wireless network. Applications range from very simple programs having a predetermined logic flow to sophisticated artificial intelligence inference engines.

Once every device 110 is identified by a unique IPv6 address 115, the device 110 can be tracked throughout multiple systems. The unique IPv6 address 115 can function as a database index. Databases 150 are preferably optimized by using sorted indices. Referring again to FIGS. 1 and 4, it is shown that audit record table 400, multiple instances of which reside in any of databases 150, comprises a plurality of columns identified as Person IPv6 405, Device IPv6 410, Date 415, Action 420, and Status 425. It should be understood that at least two IPv6 records populate any one of the audit records in table 400. Up to a plurality of rows 430 may also be provided. Generally the number of rows is variable, being dependent on audit query results. According to the present invention any column may be designated as a Primary Key for an audit search. For example, the IPv6 address is an ideal index, i.e., Primary Key that relates people (by way of the IPv6 address within the PIV Card's Card Holder Unique ID (CHUID)) to every resource, e.g., access device 110, within the federal space according to a logical naming assignment provided by the present invention. This federal space includes computers, physical access control devices, computers operating machines, and the like. A complete inventory of activities by person can be provided by using the PIV card IPv6 address 115 as a database index, i.e., primary key. Thus, audit is a powerful security control that when implemented according to the present invention addresses who (col. 405), what (col. 420), when (col. 415), where (col. 410), and why, i.e., result/action taken, (col. 425), questions.

Because the servers 140 record the audit information and perform the control functions, auditing at the device 110 is not required. The servers 140 preferably have sufficient storage and processing capability to interact with physical access control devices having substantially less memory and processing power.

Another aspect of this invention provides the capability to audit each physical access device 110 by the people accessing the device 110. These audits can be accomplished at global levels. For example, consider the activities of a bad actor. The first audit might look for all devices accessed. The second might look for everyone else who accessed those same devices to see if the bad actor acted alone.

By using standard protocols, each device 110 can be controlled remotely from a back end server such as PACS server 140 thereby eliminating the need for a control panel. This could be a significant expense if the panels require upgrades to meet FIPS 201. A standard box could be constructed that includes a contact and contact-less reader (plus biometrics such as a finger print scanner and video camera). This box, produced in quantity, could provide cost effective method for configuring doors and facility entrances. The present invention provides for such a box to be configured with a proper IPv6 address and then added to a facility's PACS. By tracking entry according to IPv6 devices 110, audit records are streamlined. This streamlining is possible because the IPv6 address 115 alone can be used to point to the record detailing the entry point.

Moreover, the operation of presently known control computer controlling devices using secure wireless communications is enhanced when used in conjunction with the unique IPv6 device identification provided by the present invention.

For example, as shown in FIG. 1, a plurality of IPv6 enabled devices 110 are controlled by server(s) 140. The wireless communications 120 may be commercial off the shelf and the server(s) 140 may be commercially available PACS products.

The present invention is capable of controlling a door by using a plurality of separate devices. As shown in FIG. 2, a device 110R is used as the interface to the user. The user access information from a PIV card 113 is passed back to the PACS server 140 which makes the decision whether to unlock the door D by sending an unlock command to device 110D, or perhaps sound an alarm. Another device having a scanning camera could also be used when someone tries to gain entry. The above door entry example is representative of facility access control provided by the present invention, however it should be understood that various types of access control devices 110 are contemplated, as well as various types of facilities, such as a computing facility, at least one computer program, a drawer to a secure file cabinet, a communications facility, and the like. Each access control device 110 is assigned a unique IPv6 address 115 so that actions of each device can be uniquely identified and controlled.

Figure 3:
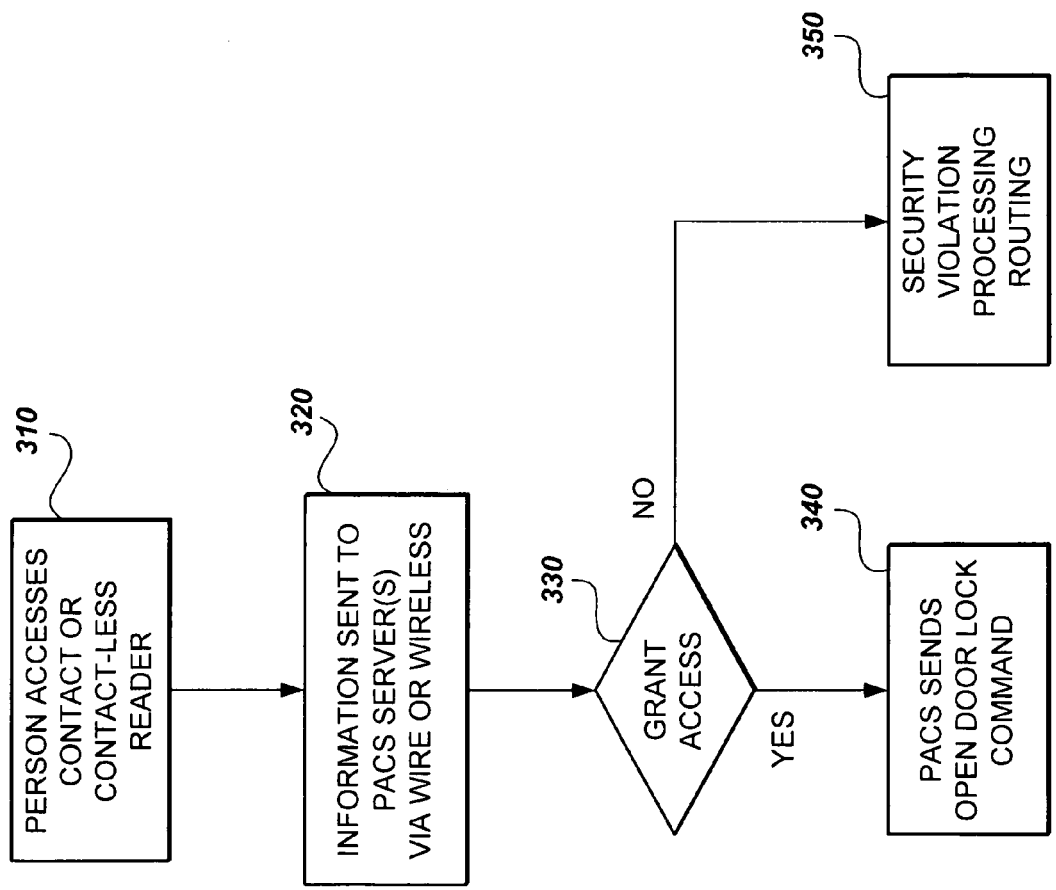
FIG. 3 is a flow diagram of entry access process of a global access control system and method according to the present invention.

FIG. 3 illustrates the information flow for the configuration of devices depicted in FIG. 2. As shown at steps 330, 340 and 350, the PACS server does the processing, the authentication, and access control. In this embodiment the reader, lock, and server each have a unique IPv6 address. The ability to control physical access at such a fine level of granularity is due to the unique IPv6 address identification 115 of every device.

Referring again to the flow chart in FIG. 3, it is shown in steps 310 through 350 that the user is tracked by his or her IPv6 address located in the PIV Card's CHUID. The CHUID is readable by contact or contact-less readers. The actual reader in turn is tracked by its unique IPv6 address. The decision making process is done by the PACS server in turn is tracked by its unique IPv6 address. Finally, the door lock is tracked by its unique IPv6 address. The granularity is such that every device and every card holder is uniquely identified by an IPv6 address, thus according to the unique IPv6 addressing 115 of the present invention, address assignments within the Federal space do not conflict. Consequently, the precise actions taken by an individual or devices can be examined in fine detail.

The present invention may also be applied to allow a central Federal facility to quickly propagate warnings to all federal departments and agencies as to the presence and activities of a bad actor. For example, consider the scenario where a terrorist has been identified and federal law enforcement agencies have an arrest warrant. By alerting all PACS servers to the person assigned the IPv6 address in question, as soon as the bad actor attempts to access a facility (physical or logical), local security can immediately be alerted and arrange for apprehension. Prior art procedures lacking a common unique name association in such a large address space, would not be able to accomplish the aforementioned scenario in a timely fashion.

Figure 5:
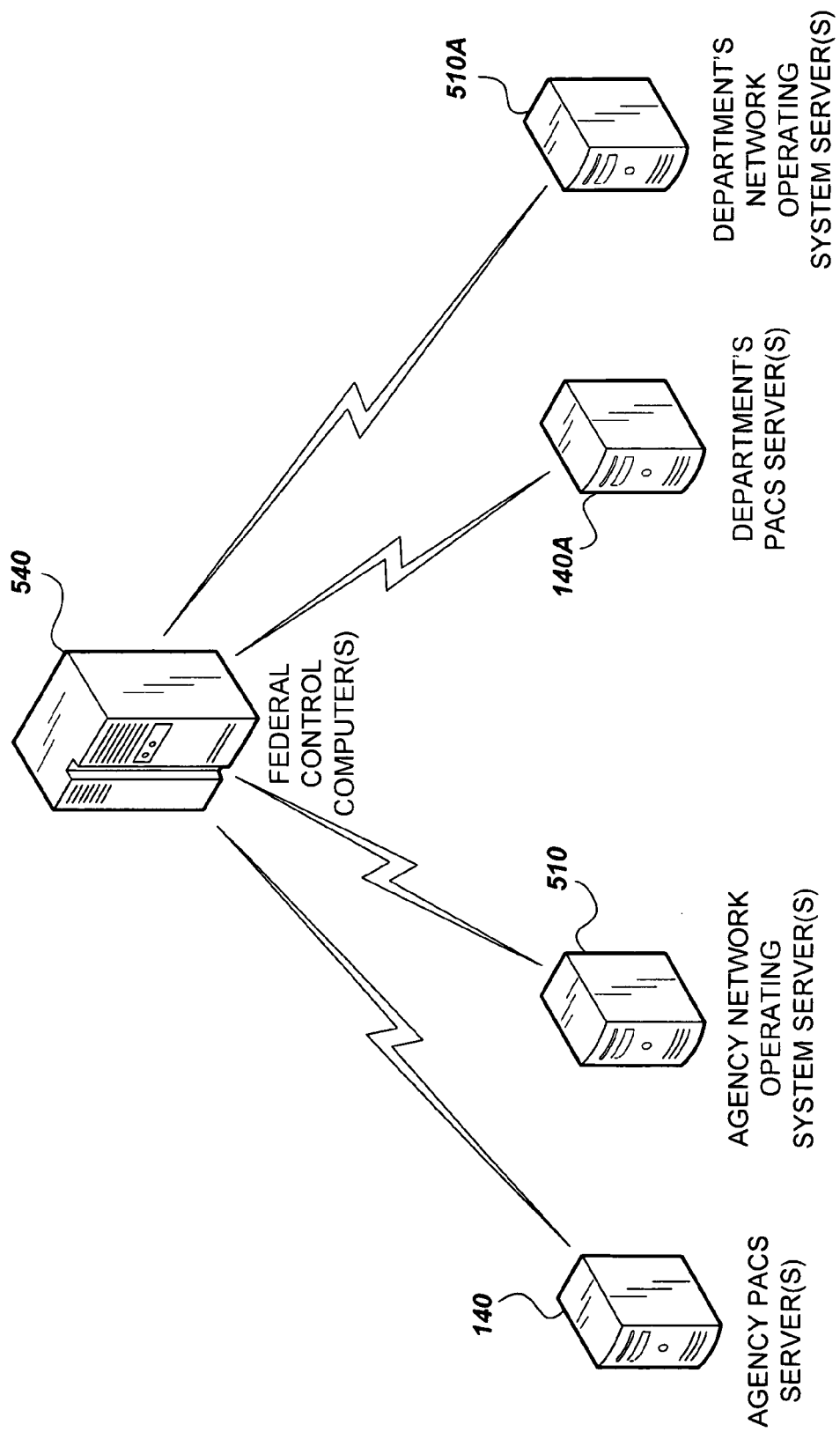
FIG. 5 is a diagrammatic view of a federal computing system hierarchy in a global access control system according to the present invention.

Additionally, a local driver's license 613 having IPv6, digital signatures, authentication, and the like may be provided in a homogeneous system for apprehending suspected terrorists and/or other suspects according to the present invention. As shown in FIG. 6, it is to be understood that any diagrammatic representation within this specification of an IPv6 address, such as IPv6 address 615 of driver's license 613, comprises 128 bits of address space, which may be, or alternatively, may not be subdivided into routing and/or subnet prefixes. Referring to FIGS. 1 and 5, a Federal computer 540 may communicate with department 140A and agency 140 PACS servers and logical access system servers 510, 510A. The Federal Computer 540 of the present invention facilitates the capability of maintaining lists of suspect users (identified by their IPv6 assignment on their PIV cards) in databases 150, so that a card status of a bad actor may quickly be changed to deny access of the bad actor to all federal facilities and networks.

Moreover, the present invention includes continuous network connectivity so that a determination regarding user access of controlled facilities is made in substantially real time. Applicant's co pending application Ser. No. 11/320, 617, filed Dec. 30, 2005, entitled "First Responder Communication System", describes a cell phone with smart card combination that could be used to authenticate first responders in locations of a temporary nature. According to the present invention, the first responder may be tracked by his or her PIV card IPv6 address. Additionally, the cell phone can be classified as an access device 110, and thus assigned a unique IPv6 address 115.

Figure 6A:
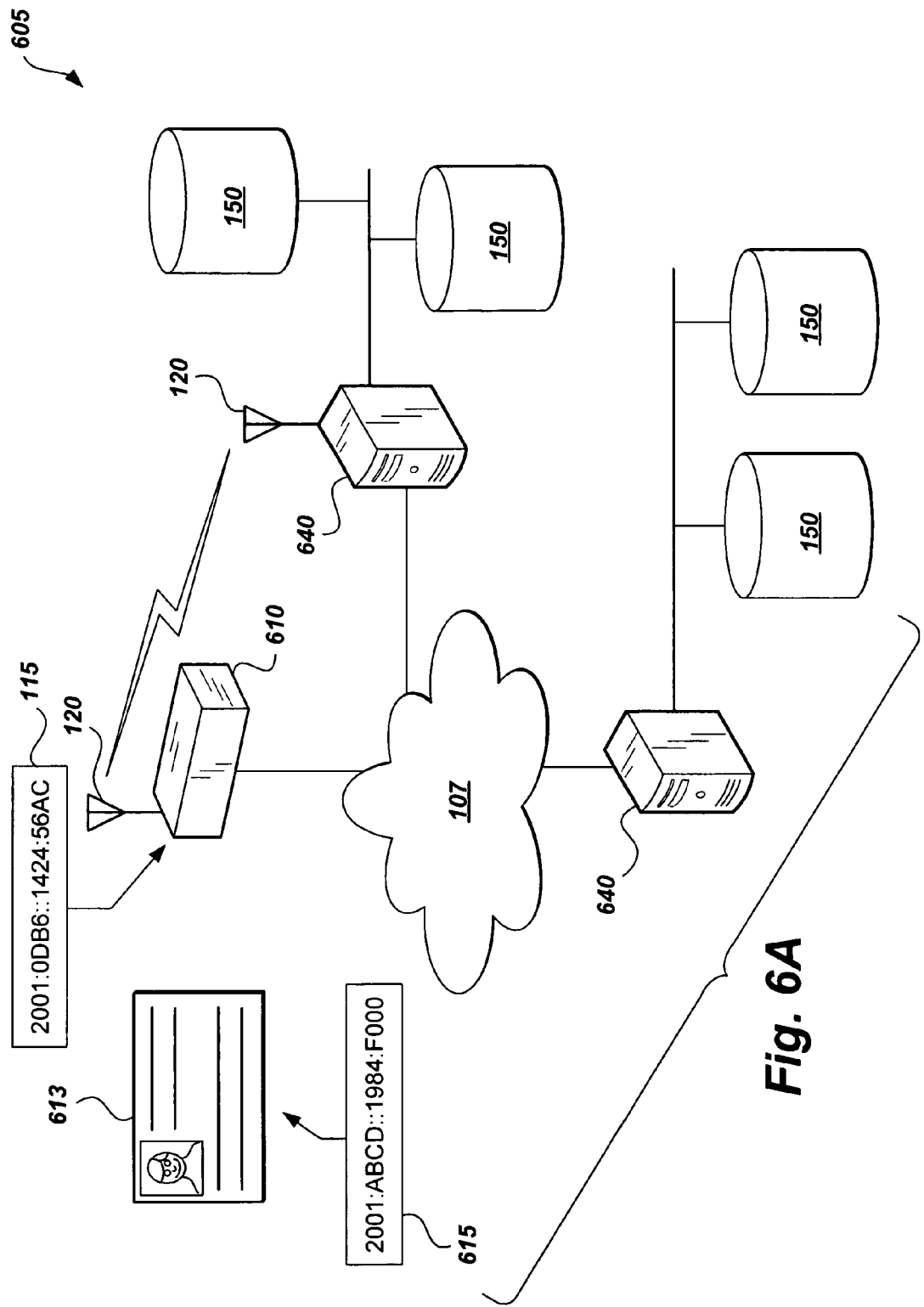
FIG. 6A is a block diagram of a police system for acquiring citizen status using the global access control system according to the present invention.
Figure 6B:
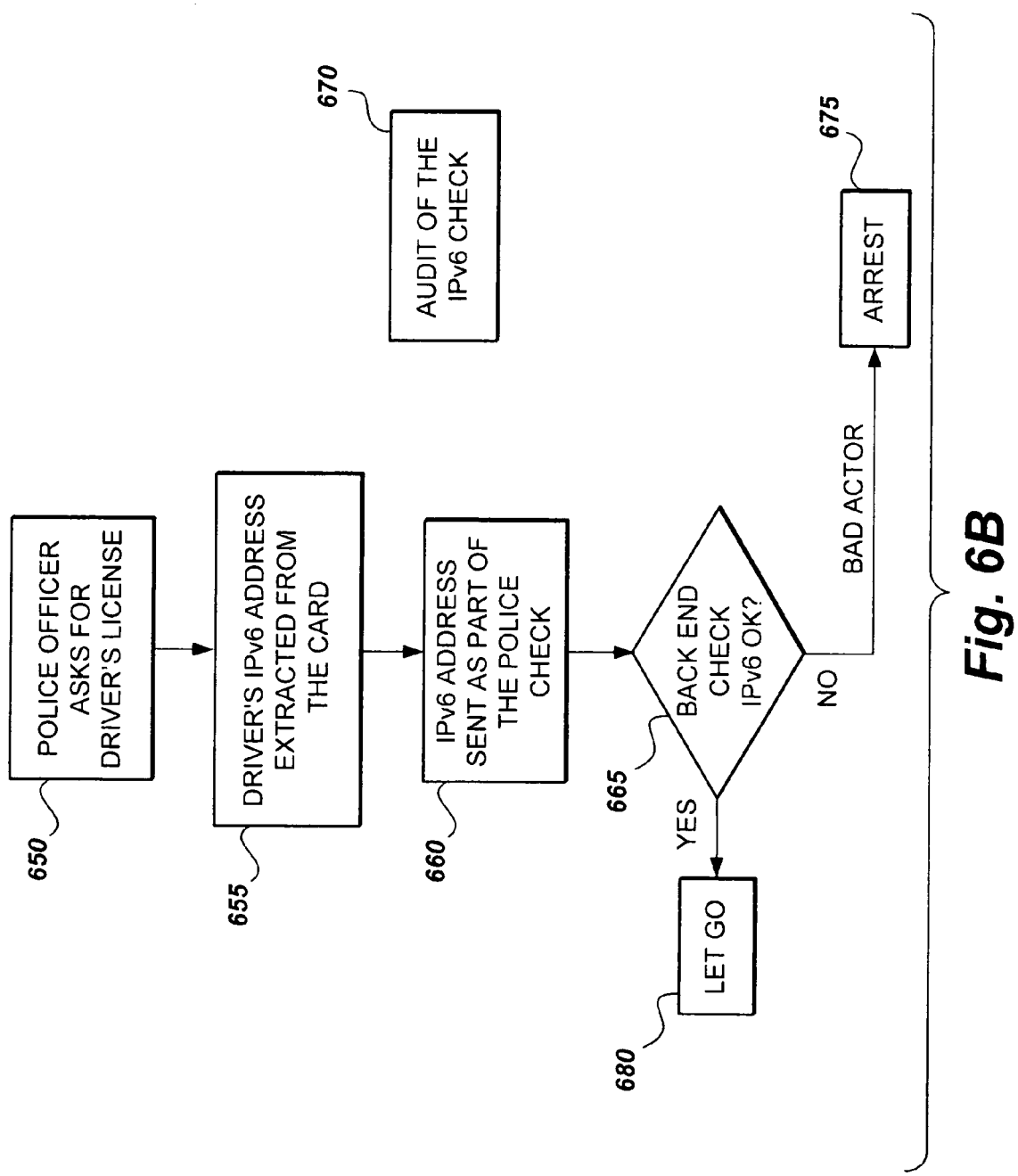
FIG. 6B is a flow diagram of a police stop procedure in a global access control system and method according to the present invention.

In another embodiment, police could be issued preferably IPv6 enabled readers that interface with police radios. Should a warning be issued, this can be quickly propagated to all locations. Due to efficient ordering, databases 150 can be structured to quickly search for people with open arrest warrants. The IPv6 enabled driver's license 613 may also facilitate police stops where state and local computing systems are configured as shown in FIG. 6A, according to the present invention. Referring to FIGS. 6A-6B, at step 650 a police officer may ask for the person's IPv6 enabled identification 613. At step 655 the IPv6 enabled identification 613, i.e., driver's license is then placed in position to allow identifying information, including the IPv6 address 615, encoded on the identification card 613 to be read by reader device 610. At step 660, the information is forwarded, preferably by wireless link 120, as part of a check for outstanding warrants. At step 665 a check is performed at the server 640. It should be understood that reader device 610 preferably has a unique IPv6 address so that servers 640 may analyze information about a user of the ID card 613 versus information about the reader device 610 to discover a relationship that may assist in the determination step 665. The IPv6 assignment of the citizen's ID card 613 is used as a primary key to pertinent records stored across multiple databases 150, spanning a plurality of jurisdictions, i.e., local, state, federal, and the like, thus quickly establishing the history of the individual. Based on the search of databases 150, for example, if there is a warrant for the arrest of the stopped individual, if the individual is a person of interest to be held for questioning, or if the individual is a parole violator, and the like, the arrest 675 is made, otherwise the individual is allowed to disengage police contact 680. As shown in standalone step 670, the police stop procedure may be audited for review.

In a similar manner, IPv6 enabled visas (not shown) could be issued to travelers to a host country, such as the United States. In this way, the full activities of foreign visitors could be audited and controlled so that investigators would have a better idea of what the traveler did. A traveler going to various federal facilities would provide a quick indication of their current status, such as a student with an expired visa, and their current location. In this way, investigators could research audit information to identify where a traveler was and then by inference look for associates that were in the same area at the same time.

It is to be understood that the present invention is not limited to the embodiment described above, but encompasses any and all embodiments within the scope of the following claims.

I claim:

1. A global access control system, comprising:
    a plurality of access control devices, the plurality of access control devices including security token reading devices, each of the access control devices having a unique IPv6 address, at least one of the access control devices controlling access to a facility;
    a TCP/IP network provided for network communication among the plurality of access control devices;
    a plurality of servers in operable communication with the access control devices, the plurality of servers having the capability to calculate access control functions based on access control applications running on the plurality of servers, wherein the plurality of servers further comprise:
        a) means for auditing the status of a first subset of the access control devices; and
        b) means for modifying the status of a second subset of the access control devices responsive to a relationship among the status of members of the first subset; and
    a plurality of mass storage units in operable communication with the plurality of servers, the mass storage units having the capability of storing information about the plurality of access control devices, the plurality of servers further having the capability to formulate and transmit control signals derived from the access control functions.

2. The access control system according to claim 1, further comprising means for producing common and interoperable audit records of both logical and physical access devices, the audit records including properties, attributes, and statuses of the access devices.

3. The access control system according to claim 2, further comprising means for analyzing the audit records in order to determine the relationship among the status of members of the first subset.

4. The access control system according to claim 3, further comprising a security token to be read by at least one of the security token reading devices for user access, the token being an IPv6 enabled Identification card.

5. The access control system according to claim 1, wherein the first subset and the second subset of the access control devices comprise the same access control devices.

6. A global access control system, comprising:
    a plurality of access control devices, the plurality of access control devices including security token reading devices, each of the access control devices having a unique identifier address;
    a TCP/IP network provided for network communication among the plurality of access control devices;
    a plurality of servers in operable communication with the access control devices, the plurality of servers having the capability to calculate access control functions based on access control applications running on the plurality of servers, wherein the plurality of servers further comprise:
        a) means for auditing the status of a first subset of the access control devices;
        b) means for modifying the status of a second subset of the access control devices responsive to a relationship among the status of members of the first subset; and
        c) means for producing common and interoperable audit records of both logical and physical access devices, the audit records including properties, attributes, and statuses of the access devices; and
    a plurality of mass storage units in operable communication with the plurality of servers, the mass storage units having the capability of storing information about the plurality of access control devices, the plurality of servers further having the capability to formulate and transmit control signals derived from the access control functions.

7. The access control system according to claim 6, wherein the audit records includes a plurality of audit queries, wherein at least two of the queries being populated by the unique identifier address.

8. The access control system according to claim 7, wherein the plurality of audit queries are selected from the group consisting of who, where, when and what queries.

9. The access control system according to claim 6, wherein the unique identifier address comprises an IPv6 address.

* * * * *